United States Patent [19]

Pastor et al.

[11] Patent Number: 4,839,328

[45] Date of Patent: Jun. 13, 1989

[54] CATALYST MATERIAL AND A PROCESS FOR ITS PREPARATION

[75] Inventors: Ricardo C. Pastor, Manhattan Beach; Luisa E. Gorre, Oxnard; Lorna D. Christensen, Thousand Oaks, all of Calif.

[73] Assignee: Hughes Aircraft Company, Los Angeles, Calif.

[21] Appl. No.: 61,619

[22] Filed: Jun. 15, 1987

[51] Int. Cl.$^4$ .................. B01J 21/04; B01J 23/42; B01J 23/44; B01J 23/46

[52] U.S. Cl. .................... 502/334; 502/332; 502/333

[58] Field of Search .............. 502/334, 332, 333; 423/437

[56] References Cited

U.S. PATENT DOCUMENTS

| | | | |
|---|---|---|---|
| 2,959,536 | 11/1960 | Brennan et al. | 208/137 |
| 3,956,190 | 5/1976 | Sinfelt | 252/466 |
| 4,222,856 | 9/1980 | Hansel et al. | 502/42 X |
| 4,292,288 | 9/1981 | Gladrow | 502/42 X |
| 4,490,482 | 12/1984 | Mathieu | 502/339 |
| 4,524,051 | 6/1985 | Wright et al. | 502/334 X |

FOREIGN PATENT DOCUMENTS 0116785 8/1984 European Pat. Off. .

Primary Examiner—W. J. Shine
Attorney, Agent, or Firm—Wanda K. Denson-Low; A. W. Karambelas; V. G. Laslo

[57] ABSTRACT

A catalyst material having a catalyst metal supported on a substrate, wherein the substrate has at least two types of surface atomic sites at which the catalyst metal can reside, and the catalyst metal resides primarily in one of those types of sites. In one catalyst material having platinum supported on an aluminum oxide substrate, the platinum atoms are located predominantly in the substrate sites having the lowest activation energy for catalysis of a chemical reaction. Population of only the low energy type of site is achieved by limiting the platinum content to from about 0.25 to about 1.0 atomic percent.

12 Claims, No Drawings

CATALYST MATERIAL AND A PROCESS FOR ITS PREPARATION

BACKGROUND OF THE INVENTION

This invention relates to catalysts, and, in particular, to catalyst materials wherein a metallic catalyst is supported on a substrate.

Catalysts are substances that accelerate chemical reactions, but are neither changed nor consumed by the reactions. Catalysts are used in a wide variety of chemical processes to obtain commercially viable rates for reactions that otherwise occur very slowly. Because the catalysts are not themselves reactants in the sense that they enter into the reaction, a relatively small amount of the catalyst is typically required.

In many cases, the catalysts promote the chemical reaction by providing a surface location at which the reactants can interact to effect the reaction. Catalysts are therefore typically provided in a finely divided form or a form having a large surface area per unit volume or weight, such as powder or sponge, to maximize the number of surface sites available to promote the reaction. The use of finely divided catalyst materials also promotes the most economical use of the catalyst, an important consideration because many catalysts are expensive to obtain or produce.

In one approach to attaining a large amount of catalyst surface area, atoms of the catalyst material are deposited upon a support surface called a substrate. The catalyst atoms are distributed over the surface of the substrate, so that little of the expensive catalyst material is present at any location other than the active surface. Maximum use is thereby attained of an available amount of the catalyst metal.

In one form of this approach, the substrate material is itself provided as small pellets or granules of a substance inert in the chemical reaction to be catalyzed, and the catalyst metal is coated upon the surface of the pellets. The coated pellets are readily fabricated, as by chemical deposition, and can be used as necessary. The reactants in the chemical reaction to be catalyzed are often in a gaseous or liquid stream, which can pass freely through a bed of the coated pellets. The coated pellets can be heated if elevated temperature catalysis is required, and can be cleaned as necessary.

In a particular chemical reaction of interest, carbon monoxide and oxygen are reacted together in the presence of a platinum catalyst, to form carbon dioxide. This catalyzed regeneration of carbon dioxide is of importance in certain types of carbon dioxide lasers, wherein the carbon dioxide is dissociated in carbon monoxide and oxygen in a high electric field in a closed system. The carbon dioxide must be regenerated by reaction of the carbon monoxide and oxygen, or the laser would soon become inoperative due to a deficiency of available carbon dioxide. However, the carbon monoxide and oxygen do not spontaneously react at a sufficiently high rate to regenerate carbon dioxide fast enough to replace that used up in the dissociation, in the absence of assistance, and therefore a platinum catalyst is provided to accelerate the regeneration reaction. Using such a catalyzed regeneration reaction, transverse electrode atmospheric lasers can be made to operate with some efficiency.

In this application of catalysis, the platinum catalysis metal may be supported on an aluminum oxide (alumina) substrate provided as fine pellets having a diameter of about ⅛ inch. The coated pellets are prepared by chemically depositing platinum atoms onto the surface of aluminum oxide pellets from a platinum-containing solution. The platinum is typically provided in an amount such that about 10–15 atomic percent of the final coated pellet is platinum.

The catalysis of the carbon dioxide regeneration reaction by platinum catalyst atoms coated onto alumina substrate pellets permits operation of the carbon dioxide laser. But, as with many catalyzed processes, a higher reaction rate would be desirable to achieve more chemical reaction product with reduced size and weight of the apparatus devoted to the regeneration processing.

There therefore exits a continuing need for an improved catalyst material for use in catalyzing reactions of many types. The catalyst material should promote increased reaction throughput, desirably with reduced usage of expensive catalysts. The present invention fulfills this need, and further provides related advantages.

SUMMARY OF THE INVENTION

The present invention resides in an improved catalyst material, which in a preferred embodiment achieves increased output of catalyzed reaction product at a selected low reaction temperature. The catalyst material of the invention is significantly less expensive and more efficient than present catalyst materials, yet permits the utilization of existing technologies both in preparing the catalyst material and in its use. The catalyst material has a lower activation energy than found for prior catalysts of its type, permitting effective operation at lower reaction temperatures. Lower temperature operation reduces heating requirements and prolongs the life of the catalyst. In a broader aspect, the present invention permits the design of specialized catalyst materials having their properties tailored to particular reaction requirements.

In accordance with the invention, a catalyst material comprises a substrate selected from the group consisting of aluminum oxide and tin oxide, and a metal selected from the group consisting of platinum, iridium, rhodium, and palladium, located at the surface of the substrate, the metal being present in an amount so as to substantially populate only those surface sites having an activation energy of about 3 kilocalories per mole. The metal of the catalyst material is present in an amount of from about 0.25 to about 1.0 atomic percent of the substrate. In a preferred embodiment, the catalyst material comprises an aluminum oxide substrate, and platinum atoms located at the surface of the substrate, the platinum being present in an amount of from about 0.25 to about 1 atomic percent of the substrate.

It has been discovered that the atoms of the catalyst metal, such as platinum, can reside in at least two different types of residence sites on the surface of the substrate, such as aluminum oxide. The catalytic activity of the catalyst material is greatest when only one of the types of sites is populated with the catalyst metal. The preferred type of site is preferentially populated first, and therefore the total amount of platinum is limited to a maximum of about 1 atomic percent of the substrate material. At higher platinum contents, the second type of site is increasingly populated, reducing the efficiency of the catalyst and wasting platinum. When less than about 0.25 atomic percent platinum is used, the platinum resides in the preferred type of sites, but these sites are underpopulated and therefore the rate of catalysis falls due to the lack of sufficient surface reaction sites. The optimum platinum content is about 0.5 atomic percent.

The type of site first populated at lower platinum contents has a much lower activation energy for catalysis than does the other type of site. The catalysis may therefore be accomplished at a lower temperature when only the lower energy type of site is involved. Thus, a significant platinum population in the other type of site can actually be detrimental to catalysis.

In the specific application of particular interest, a process for catalyzing the regeneration of carbon dioxide in a carbon dioxide laser comprises the steps of furnishing a catalyst material of the type just described, and contacting a gas mixture containing carbon monoxide and oxygen to the catalyst material, whereupon the carbon monoxide and oxygen react to produce carbon dioxide.

In another aspect of the invention, a process for preparing a catalyst material comprises the steps of providing a substrate material having at least two types of residence sites at the surface thereof, in which atoms of a catalyst metal may reside; determining the activation energies of a chemical reaction catalyzed by the catalyst metal at the surface of the substrate material; selecting one of the types of residence sites as most favorable for catalyzing the reaction; and depositing the catalyst metal onto the surface of the substrate material so as to populate primarily the selected type of residence sites. The preferred embodiment of a platinum catalyst metal on an aluminum oxide substrate is one example of this broader scope of invention.

It will be appreciated that the present invention presents an important advance in the art of design of catalyst material systems. The catalyst material of the invention achieves increased catalytic efficiency and preformance, with reduced use of the expensive catalyst metal. This new catalyst has a lower activation energy for catalysis of reactions, and therefore permits the catalyzed reaction to be performed at a lower temperature than was previously possible. A lower temperature reaction results in extended catalyst life. The procedure of the invention provides an analytical technique for designing catalyst materials, which are tailored to specific requirements. Other features and advantages of the invention will be apparent from the following more detailed description of the preferred embodiment, which illustrates, by way of example, the principles of the invention.

DETAILED DESCRIPTION OF THE PREFERRED EMBODIMENT

In a preferred embodiment, platinum metal catalyst is deposited on the surface of an aluminum oxide (alumina) substrate. The aluminum oxide is a mixture of gamma alumina and pseudo-boehmite having a purity of greater than 99.85 percent and a specific surface area of 275 to 320 square meters per gram, available from Norton Corporation as pellets or granules of about ⅛ inch diameter. The source of the platinum is hexachloroplatinic acid, $H_2PtCl_6$, preferably of reagent grade. In the work described herein, a standard acid solution containing 0.14394 grams of platinum per milliliter was avilable and used.

Substantially all of the platinum in the furnished acid is deposited upon the aluminum oxide substrate. The amount of deposited platinum catalyst metal is therefore determined from the amount of acid provided. To prepare the preferred catalyst material having about 0.5 atomic percent platinum, it was calculated that about 0.09565 grams of platinum for 10 grams of aluminum oxide was required. This amount of platinum is found in 0.6645 milliliters of the hexachloroplatinic acid standard solution.

The necessary amount of the standard solution of hexachloroplatinic acid, mixed with a sufficient amount of water to cover the aluminum oxide, were placed in a reflux condenser. Sufficient sodium hydroxide solution to adjust the pH to the range of 4–5 was added, and the liquid was brought to a boil. Ten grams of the aluminum oxide pellets were added to the boiling liquid. The boiling was continued overnight. Initially, the liquid was orange, indicating the presence of $(PtCl_6)^{-2}$ anion. After the overnight boiling procedure, the remaining liquid was colorless, indicating that the platinum-containing anion had been deposited onto the surface of the aluminum oxide as a platinum-containing compound.

The aluminum oxide pellets were removed from the reflux condenser and dried. They were in substantially the same pellet form as when added to the reflux condenser, and had essentially the same visual appearance. The pellets were placed into an aluminum oxide boat. The boat was placed into a furnace under a flowing atmosphere of about 15 volume percent hydrogen in nitrogen, and heated to a temperature of 200° C. for 5 hours. During this time, the platinum-containing compound on the surface of the aluminum oxide was reduced by the hydrogen, leaving platinum deposited upon the surface of the aluminum oxide pellets. From the amount of platinum initially placed into the reflux condenser, it is concluded that about 0.5 atomic percent platinum was present on the aluminum oxide. The color of the final coated pellets was black, due to the platinum deposited on the surface.

As used herein, the aluminum oxide is termed a substrate, and the platinum is termed the catalyst metal. The platinum catalyzes certain chemical reactions, and is supported and positioned upon the surface of the substrate in energetically favorable atomic positions. The combination of the substrate and the catalyst metal is termed the catalyst material.

In measurements discussed below, it was determined that a significant improvement in the catalysis behavior of the catalyst material is obtained for a platinum content in the range of about 0.25 to about 1.0 atomic percent of the aluminum oxide. The most significant improvement was obtained for a platinum content of about 0.5 atomic percent. While not wishing to be bound by this possible explanation, it is believed that the following analysis of the placement of the catalyst metal atoms on the surface of the substrate accounts for the observed improved behavior of the catalyst material of the invention.

In prior practice, the amount of catalyst metal in the catalyst material was substantially greater than the amount provided according to the present invention, resulting in a material that was qualitatively different from the present catalyst material. The amount of catalyst metal deposited on the surface of the substrate to form the catalyst material of the present invention is less than one monolayer at the irregular surface of the substrate. The amount of catalyst metal is selected to populate primarily only one type of surface site of the substrate, termed a Type II site, which has an activation energy for catalysis of about 3 kCal (kilocalories) per mole. By contrast, the activation energy for platinum on a platinum substrate is about 19 kCal per mole. The activation energy for platinum on a aluminum oxide substrate, where the platinum is present in an amount of about 10 percent and resides primarily in another type of site termined a Type I site, is about 21 kCal per mole.

The activation energy for platinum catalyst metal present primarily in Type II sites on the surface of the aluminum oxide substrate is far less than for a material wherein the platinum is present primarily in Type I sites. The significant practical consequence of the reduction in activation energy is that the catalysis reaction may be accomplished at a lower temperature using the catalyst material having the lower activation energy, because the catalyzed chemical reaction is thermally activated and therefore occurs more readily when the thermal activation energy is lower.

In the range of about 0.25 to about 1.0 atomic percent platinum, the platinum primarily populates the Type II sites having the 3 kCal per mole activation energy. As the platinum content increases within this range, an increasing fraction of the Type II sites are filled. (According to the thermodynamics, a relatively small fraction of the platinum atoms will reside in the Type I sites even at low platinum contents in the range of about 0.25 to about 1.0 atomic percent, and this small population is tolerated in the present invention.) For platinum contents below about 0.25 atomic percent, an insufficient number of Type II sites are filled to give a significant improvement in catalytic activity over the prior material wherein a large fraction of the Type I sites are populated.

For platinum contents above about 1.0 atomic percent, the Type II sites are filled, and the Type I sites become increasingly populated. The presence of platinum in the Type I sites actually impedes the catalyzed reaction at low temperatures, inasmuch as reactant atoms are immobilized at the Type I sites having a much higher activation energy that the Type II sites. The filling of the Type I sites therefore reduces the amount of available reactant and causes a partial surface covered that impedes access of the reactants of the Type II sites. Near the preferred platinum content of about 0.5 atomic percent, a sufficient number of Type II sites are filled by platinum atoms to give good low temperature catalytic activity, and filling of the Type I sites has not occurred to a significant degree.

In this analysis of surface sites on the substrate as applied to catalysis, the surface sites in general can be locations inherently present on the surface of the substrate, or locations created by the deposition of the catalyst metal onto the surface. That is, some of the sites can be those wherein the platinum is deposited upon other platinum atoms in second or subsequent layers in excess of a monolayer. The activation energy for Type I sites of platinum on aluminum oxide is close to the activation energy for platinum deposited on platinum. The Type I sites may therefore possibly be high energy sites on the surface of the aluminum oxide itself, or high energy sites on the surface of the first monolayer (or subsequent layers) of platinum atoms deposited on the aluminum oxide, or both.

For the purposes of the present preferred embodiment, the exact location of the Type I sites is not material, other than to the extent that they exist and that their activation energy is greater than that of the Type II sites. For the broad aspect of the invention, however, "sites" can include and refer to locations inherently present on the surface of the substrate, and locations created by the deposition of the catalyst metal onto the surface of the substrate, or both taken together when they have comparable activation energy. The important fact is that there is a low energy type of site available which is different from the higher energy site, and the preferential fillig of the low energy site by the catalyst metal results in reduced activation energy and improved reaction throughput.

A number of batches of aluminum oxide coated with platinum were prepared by the procedure described previously, except that the amount of hexachloroplatinic acid was varied to achieve a range of platinum contents ranging from 0.10 to 10 atomic percent. Samples having from about 0.25 to about 1.0 atomic percent platinum are within the scope of the present invention, while those having a lower or higher platinum content are not. Each sample was in turn measured to determine its activity in relation to the catalyzed regeneration of carbon dioxide from carbon monoxide and oxygen.

Activity was determined by heating the platinum coated aluminum oxide in a differential scanning calorimeter (DSC) in a simulated reaction atmosphere having, in mole percent, 44 percent helium, 30 percent carbon dioxide, 20 percent nitrogen, 4 percent carbon monoxide, and 2 percent oxygen, which mixture was flowed past 30 milligrams of the catalyst at a pressure of 1 atmosphere and a rate of 1 cubic centimeter per second. The activity A at a given temperature, and for the platinum content of the specimen under test, was measured from the curve obtained. The activity A was measured at several temperatures in the region where A varied linearly with temperature, and averaged. Another value of interest is A(n), the activity per unit platinum content or the ratio of A to the platinum content in the specimen. The value of A(n) in the following table is given in a scale where unity was assigned to the least active specimen, having 10 atomic percent platinum, wherein A is 7 mW under these particular conditions.

| Atomic Percent Pt | A, (mW) | A(n), (mW/pct) |
|---|---|---|
| 10. | 7 | 1 |
| 2. | 168 | 12 |
| 1. | 154 | 22 |
| 0.5 | 291 | 83 |
| 0.25 | 42 | 24 |
| 0.10 | 33 | 47 |

Both the activity A and the normalized activity A(n) increase with decreasing platinum content, increasing substantially in the range of less than 1 percent platinum to a maximum value at about 0.5 percent platinum. With further decreases in the platinum content, the activity A decreases to unacceptably low values below about 0.25 atomic percent platinum. The activity A is important as an indicator of the rapidity of the reaction at low temperature.

The normalized activity A(n) is an indicator of the efficiency of the available platinum atoms in catalyzing the reaction. For the preferred 0.5 atomic percent platinum catalyst material, the efficiency is over 80 times greater than for a conventional coated catalyst having 10 percent platinum. This increased efficiency, coupled with improved activity of a factor of over 40, means that the platinum is both more effective and more efficient in the catalyst material of the invention, when provided in the form of the catalyst material of the invention. The catalyst material of the invention can therefore effect a significant economic savings in the cost of the expensive catalyst metal, because of the surprisingly improved activity and efficiency at low platinum contents.

Arrhenius plots were prepared for the two specimens having 10 and 0.5 atomic percent platinum, the former being outside the range of the invention, but indicative of the current practice in the art, and the latter being the preferred embodiment. The Arrhenius plot for the 10 percent platinum specimen showed a curve that could be explained only by postulating a mixture of sites having activation energies of 3.2 and 20 kCal per mole. The Arrhenius plot for the 0.5 percent platinum specimen was a straight line, having an activation energy of 3.2 kCal per mole. The temperature for the onset of measurable activity was 56° C. for the catalyst material having 0.5 atomic percent platinum. The temperature for the onset of measurable activity was 138° C. for the prior material having 10 atomic percent platinum. The catalyst material of the invention can be used to catalyze the regeneration reaction at a lower temperature than the prior material, and with greater efficiency and activity at that lower temperature. The life of the catalyst is therefore extended, the regeneration reaction can be accomplished at lower temperature and with less catalyst, and the required amount of expensive catalyst material is reduced.

Although a particular embodiment of the invention has been described in detail for purposes of illustration, various modifications may be made without departing from the spirit and scope of the invention. Accordingly, the invention is not to be limited except as by the appended claims.

What is claimed is:

1. A catalyst material for catalyzing the regeneration of carbon dioxide comprising:
   a substrate selected from the group consisting of aluminum oxide and tin oxide; and
   a metal selected from the group consisting of platinum, iridium, rhodium, and palladium, located at the surface of said substrate, the metal being present in an amount from about 0.25 to about 1 atomic percent of the substrate so as to substantially populate only those surface sites having an activation energy of about 3 kilocalories per mole to enable the catalyst material to be activated at a lower activation energy such that enhanced catalytic activity is provided at lower temperatures.

2. The catalyst material of claim 1, wherein the substrate is present in the form of pellets.

3. The catalyst material of claim 1, wherein the substrate is aluminum oxide.

4. The catalyst material of claim 1, wherein the platinum metal is present in an amount of about 0.5 atomic percent of the substrate.

5. A catalyst material for catalyzing the regeneration of carbon dioxide comprising:
   an aluminum oxide substrate; and
   platinum atoms located at the surface of said substrate, the platinum being present in an amount of from about 0.25 to about 1 atomic percent of the substrate so as to substantially populate only those surface sites having an action energy of about 3 kilocalories per mole to enable the catalyst material to be activated at a lower activation energy such that enhanced catalytic activity is provided at lower temperatures.

6. The catalyst material of claim 5, wherein the substrate is present as pellets.

7. The catalyst material of claim 5, wherein the platinum is present in an amount of about 0.5 atomic percent of the aluminum oxide and the platinum.

8. The catalyst material of claim 1 further comprising:
   the subtrate material having at least two types of residence sites at the surface thereof for receiving a metal species and wherein the atoms of the catalyst metal located at the surface of the substrate reside primarily in only one of the types of residence sites to enable the catalyst material to be activated at a lower activation energy such that enhanced catalytic activity is provided at lower temperatures.

9. The catalyst material of claim 8, wherein the inhabited residence site has the lowest catalysis activation energy of any of the types of residence sites.

10. The catalyst material of claim 8, wherein at least one of the types of residence sites is for metal atoms lying on metal atoms.

11. A process for preparing a catalyst material, comprising the steps of:
    providing a substrate material selected from the group consisting of aluminum oxide and tin oxide, having at least two types of residence sites at the surface thereof, in which atoms of a catalyst metal selected from the group consisting of platinum, iridium, rhodium, and palladium, in an amount from about 0.25 to about 1 atomic percent of the substrate, may reside;
    determining the activation energies of a chemical reaction catalyzed by the catalyst metal at the surface of the substrate material;
    selecting one of the types of residence sites as most favorable for catalyzing the reaction; and
    depositing the catalyst metal onto the surface of the substrate material so as to populate primarily the selected type of residence sites to enable the catalyst material to be activated at a lower activation energy such that enhanced catalytic activity is provided at lower temperatures.

12. A catalyst material prepared by the process of claim 11.

* * * * *